United States Patent
Kohlstrand et al.

(10) Patent No.: US 6,553,638 B1
(45) Date of Patent: Apr. 29, 2003

(54) METHODS FOR DETERMINING THE EXISTENCE AND THE SIZE OF A GAP AND FOR DETERMINING THE AMOUNT BY WHICH A PORTION OF AN ASSEMBLY DEFLECTS

(75) Inventors: Kelly Michael Kohlstrand, Wyandotte, MI (US); Stephen Lewis Bruford, West Bloomfield, MI (US); Stefan Obenauer, Ann Arbor, MI (US); Ingobert Schmadel, Ann Arbor, MI (US)

(73) Assignees: Ford Global Technologies, LLC, Dearborn, MI (US); Metronom U.S. Inc., Ann Arbor, MI (US)

( * ) Notice: Subject to any disclaimer, the term of this patent is extended or adjusted under 35 U.S.C. 154(b) by 0 days.

(21) Appl. No.: 09/683,144

(22) Filed: Nov. 27, 2001

(51) Int. Cl.[7] .................. G01B 21/16; G01M 19/00; B23P 6/00
(52) U.S. Cl. ................ 29/402.03; 29/407.05; 33/194; 33/600; 73/865.9
(58) Field of Search ............... 29/407.05, 402.03; 73/865.9; 277/320, 321, 317; 33/194, 600, 608, 533, 645

(56) References Cited

U.S. PATENT DOCUMENTS

| | | | | | |
|---|---|---|---|---|---|
| 4,345,380 | A | * | 8/1982 | Vis ........................... | 33/784 |
| 4,589,199 | A | * | 5/1986 | Ohtaki et al. ........ | 29/407.05 X |
| 4,606,129 | A | * | 8/1986 | Barrowman et al. ...... | 33/533 X |
| 4,973,957 | A | * | 11/1990 | Shimizu et al. ........ | 340/825.52 |
| 5,067,250 | A | * | 11/1991 | Auweiler et al. .......... | 33/533 X |
| 5,201,106 | A | * | 4/1993 | Moore et al. ............ | 29/407.05 |
| 5,203,811 | A | * | 4/1993 | Hirotani et al. .......... | 29/407.05 |
| 5,796,615 | A | * | 8/1998 | Madaraishi et al. . | 29/407.05 X |
| 6,138,337 | A | * | 10/2000 | Lezuch et al. ........... | 29/407.05 |
| 6,276,050 | B1 | * | 8/2001 | Mauer et al. ........ | 29/407.05 X |
| 6,308,429 | B1 | * | 10/2001 | Green et al. .............. | 33/194 X |

* cited by examiner

Primary Examiner—Thomas P. Noland
(74) Attorney, Agent, or Firm—Ford Global Technologies LLC

(57) ABSTRACT

A method 500 and an assembly 200 for determining the presence of gaps located between a first portion 240 of a partially assembled apparatus 228 and a second portion 230. The existence and size of the gap may be discerned by use of a wireless gap sensor 309 which is engaged by the portion 230 as it abuts or comes into close proximity with the portion 240. Other methods 400 and 500 may be respectively used to respectively discern the existence and the size of a gap within an assembled vehicle and to measure the deflection of a portion of an apparatus, such as a vehicle.

16 Claims, 8 Drawing Sheets

METHODS FOR DETERMINING THE EXISTENCE AND THE SIZE OF A GAP AND FOR DETERMINING THE AMOUNT BY WHICH A PORTION OF AN ASSEMBLY DEFLECTS

BACKGROUND OF INVENTION

The present invention generally relates to methods for determining the existence and the size of a gap and the amount by which a portion of an assembly deflects and more particularly, to methods which utilize wireless sensors for accurately determining the existence and the size of a vehicular air gap, such as and without limitation an air gap which may exist between a portion of the vehicular frame and a door and for determining the amount by which a vehicle door deflects as the vehicle is being operated or tested.

It is desirable to ascertain the existence of a gap and the amount or size of the gap occurring between a vehicular door and the frame as the vehicle is being assembled and before the door is finally secured to the vehicle, thereby allowing for an automated or manual modification of a portion of the pre-assembled vehicle in order to eliminate or substantially reduce the gap. Further, it is desirable to efficiently and accurately determine the existence and the size of a gap occurring within an assembled vehicle in order to determine potential sources of undesirable leakage (e.g., wind and/or water leakage) within the vehicle, and it is desirable to determine the amount by which a portion of a vehicle or other assembly deflects as the assembly is being operated, in order to allow certain design configurations to be properly evaluated and to allow certain portions of the vehicle to be studied and evaluated.

While current strategies and techniques do allow the foregoing gap identification and measurements to be made, they do so in a relatively inaccurate manner and by the use of sensor assemblies which are physically coupled to a display and/or receiver assembly. That is, the wires which physically connect the sensor assemblies to a display and/or receiver assembly often become dislodged, thereby causing the sensor assemblies to become dislocated and provide errant data. Moreover, these "hardwired" sensor assemblies are not readily adapted to be used by robots or other automation assemblies due to the need to "hardwire" these sensor assemblies to a display and/or receiver assembly. The present invention overcomes these drawbacks in a new and novel manner.

SUMMARY OF INVENTION

It is a first non-limiting advantage of the present invention to provide methods and strategies for determining the existence and the size of a gap in a manner that overcomes some or all of the previously delineated drawbacks of prior methods and strategies.

It is a second non-limiting advantage of the present invention to provide a method for determining the existence and the size of a gap in a manner which overcomes some or all of the previously delineated drawbacks of prior strategies and methods and which obviates the need for wires which connect the sensor to a receiver and/or display device.

It is a third non-limiting advantage of the present invention to provide automated methods and strategies for identifying the existence and the size of a gap in an efficient and cost effective manner.

According to a first non-limiting aspect of the present invention, a method for measuring a gap between a first and a second portion of a partially assembled apparatus is provided. The method comprises the steps of providing a robot; providing a wireless gap sensor; providing a receiver that is in communication with the wireless gap sensor; causing the robot to place the wireless gap sensor upon the first portion of the partially assembled apparatus; causing the robot to move the second portion of the partially assembled apparatus against the mounted wireless gap sensor, effective to cause the wireless gap sensor to measure the gap between the first and the second portion; and causing the wireless gap sensor to transmit the measured gap to the receiver.

According to a second non-limiting aspect of the present invention, a method for determining the existence of a gap between the door frame and a door of a vehicle of the type having a removable seal member which is operatively disposed upon the frame is provided. The method comprises the steps of determining the existence of leakage into the vehicle; removing the seal after the existence of the leakage is determined; providing a wireless gap sensor; opening the door of the vehicle; removing the seal; operatively mounting the wireless gap sensor upon the frame; closing the door against the wireless gap sensor, effective to cause the wireless gap sensor to ascertain the existence of a gap between the door frame and the door of the vehicle.

According to a third non-limiting aspect of the present invention, a method for measuring an amount of deflection of a portion of a vehicle is provided. The method comprises the steps of providing a wireless gap sensor; disposing the sensor upon a second portion of the vehicle in close proximity to the portion of the vehicle; operating the vehicle, effective to cause the portion of the vehicle to engage the wireless gap sensor, thereby causing the wireless gap sensor to create and transmit a certain signal which is representative of an amount of deflection of the portion of the vehicle; and receiving and displaying the certain signal.

These and other features, aspects, and advantages of the present invention will become apparent to those of ordinary skill in the art from a reading of the following detailed description of the preferred embodiment of the invention and by reference to the following drawings.

DETAILED DESCRIPTION

Figure 1:
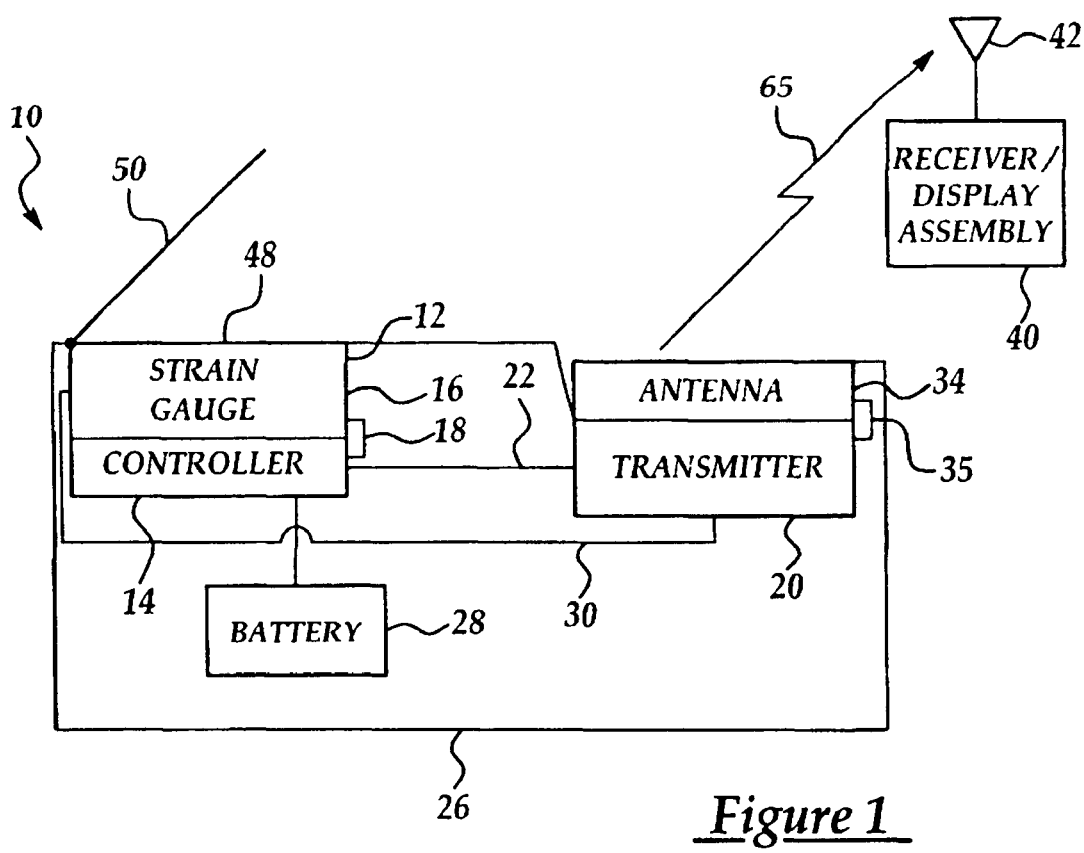
FIG. 1 is a block diagram of a gap identification and measurement assembly, which may be used by the methodologies of the preferred embodiment of the invention.

Referring now to FIG. 1, there is shown a gap identification and measurement assembly 10, which is made in accordance with the teachings of the preferred embodiment of the invention. Particularly, assembly 10 includes a measurement portion 12 having a controller 14 which is operable under stored program control and a strain gauge 16 which is physically and communicatively coupled to the controller 14 by the use of bus 18. In an alternate embodiment of the invention, the controller 14 and the strain gauge 12 form a single assembly.

The assembly 10 further includes a wireless transmitter 20 (e.g., a radio frequency or an infrared type of transmitter), which is physically and communicatively coupled to the controller 14 by the use of bus 22. Particularly, the measurement portion 12 and the transmitter 20 are contained within a housing 26. Assembly 10 further includes a battery or a source of energy 28, which is physically and communicatively coupled to the controller 14, to the strain gauge 16, and to the transmitter 20 by the use of bus 30, and which is also operatively contained within the housing 26. Assembly 10 further includes an antenna 34 which is coupled to the transmitter 14 by bus 35 and which may be operatively and protectively positioned within the housing 26 or which may alternatively protrude from the housing 26, and a receiver and/or display assembly 40 which includes an antenna 42. Particularly, the receiver 40 is wirelessly and communicatively coupled to the transmitter 20 by the cooperative use of antennas 34 and 42, thereby obviating the need for wires or other members to physically couple the receiver and display portion 40 to the transmitter 20. Further, the strain gauge 16 includes a top surface 48, which is exposed or is accessible through the housing 26 and a generally flat member 50, which is pivotally coupled to the surface 48.

Figure 3:
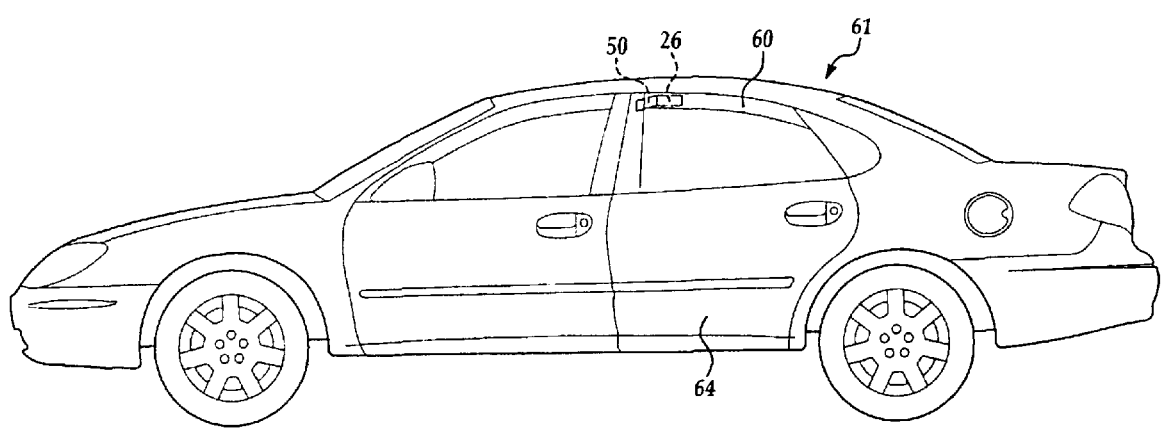
FIG. 3 is a side view incorporating a sensor, which is made in accordance with the invention.

As shown best in FIG. 3, the housing 26 is operatively placed upon a first portion 60, such as a frame or pillar of a vehicle 61 (or other assembly) which is to abuttingly and selectively receive a door 64 (or another type of member). In one non-limiting embodiment, housing 26 may be secured to the portion 60 by an adhesive, by a fastener, by a magnet, or by any other conventional and commercial apparatuses. Particularly, the member 50 is extended from the portion 60 and is contacted by the door 64 as the door 64 closes and abuts the portion 60, thereby forcing the member 50 against the surface 48 and creating pressure or force against the surface 48. The strain gauge senses or "reads" the amount of force that is exerted upon the member 50 or upon the surface 48 and provides this information to the controller 14 by the use of bus 18. The controller 14 then associates the sensed force with a certain gap which may exist between the door 64 and the portion 60 (e.g., between the portion of the vehicular frame or pillar 60 to which the housing 26 is mounted and that portion of the vehicular door 64 which engages the protruding member 50.

That is, in the most preferred embodiment of the invention, a table is created and stored within the controller 14 and is developed through calibration. The table uniquely associates a force upon the member 50 and/or the surface 48 with a certain size of a gap that may exist between the portion of the vehicular frame or pillor 60 to which the housing 26 is mounted and the closed door 64. For example, a force of 20 Newtons typically indicates the existence of a gap having a size or a width of about one sixteenth of an inch, and a force of about 30 Newtons typically indicates the existence of a gap having a size or width of about one thirty-second of an inch. Other calibration values may be utilized in other non-limiting embodiments. As the force is sensed, the controller 14 first determines whether a gap exists by ascertaining whether the force exceeds a certain predetermined threshold value (e.g., about 40 Newtons). If the controller 14 determines that a gap exists, the controller 14 then access the table and an interpolation of the stored data is made to identify the size of a gap between the door 64 and the portion 60 corresponding to the currently sensed force. The existence of a gap and the size of the gap are then communicated to the transmitter 20 by the controller 14 by use of the bus 30. The transmitter 20 then wirelessly communicates this information to the receiver and display assembly 40 by the use of signal 65, effective to allow a user of the assembly 10 to identify the existence and the size of a gap between the vehicular frame portion 60 and the door 64. Hence, the use of wires or other members, which couple the receiver/display 40 to the transmitter 20, are obviated.

Figure 2:
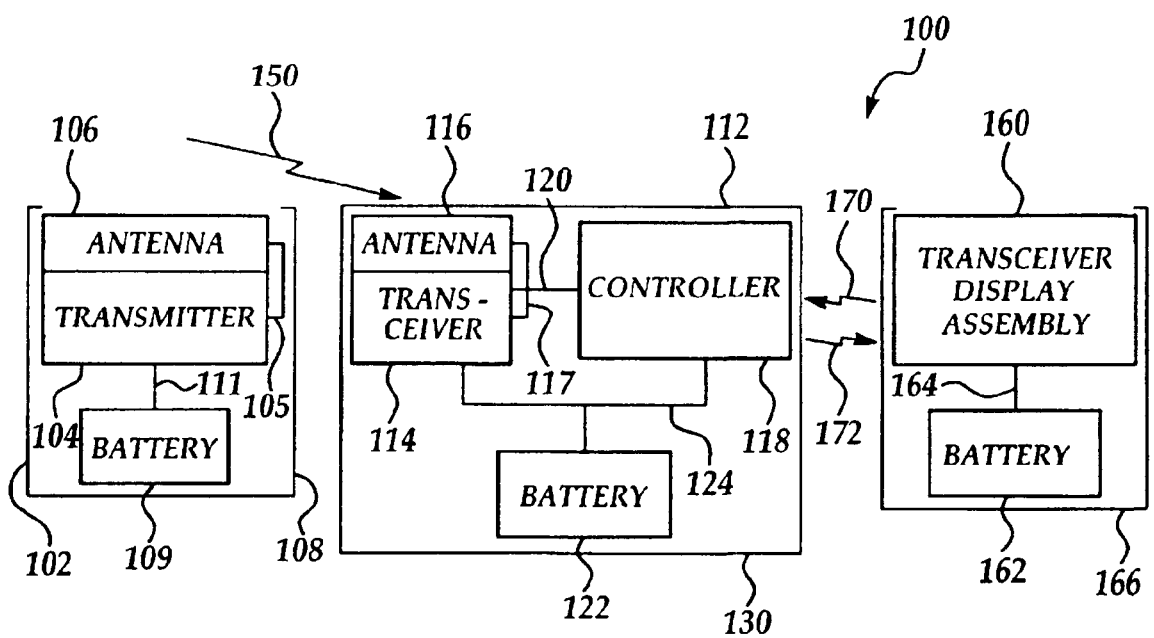
FIG. 2 is a block diagram of a gap identification and measurement assembly, which alternatively may be used by the methodologies of the preferred embodiment of the invention.

Referring now to FIG. 2, there is shown a gap identification and measurement assembly 100, which is made in accordance with the teachings of a second embodiment of the invention. As shown, assembly 100 includes a first portion 102, which includes a transmitter 104 and an antenna 106, which is coupled to the transmitter 104 by bus 105. The transmitter 104 and the antenna 106 are each operatively contained within a protective housing 108. Portion 102 also includes a battery or energy storage assembly 109 which is coupled to the transmitter 104 by the use of bus 111 and which is operatively contained within the housing 108.

Assembly 100 further includes a second portion 112, which includes a transmitter and receiver or "transceiver" 114 which is physically and communicatively coupled to an antenna 116 by bus 117 and a controller 118, which operates under stored program control. Particularly, the controller 118 is physically and communicatively coupled to the transceiver 114 by the use of bus 120. Further, assembly 112 includes a battery or energy storage apparatus 122, which is physically and communicatively coupled to the transceiver 114 and to the controller 118 by the use of bus 124. The transceiver 114, antenna 116, controller 118, and the battery 122 are each operatively contained within a housing 130 and, in one non-limiting embodiment of the invention, the antenna 116 is exposed or accessible through the housing 130.

In operation, the first portion 102 is placed upon a first of two members or portions, such as portion or member 60, which are to abuttingly engage. The second portion 112 is placed upon a second of the two abuttingly engaging portions, such as the vehicular door 64. As the two portions 60, 64 engage, a signal 150, which is generated by the transmitter 104 is received by the transceiver 114. The controller 118 determines the strength of the received signal (e.g., it will be at its highest level when the two members 60, 64 have abuttingly engaged). The strength of the received signal is indicative of the distance between the first and second portions 102, 112, (and between the members or portions 60, 64), thereby identifying the existence and the size of a gap between these two abuttingly engaging members. That is, a table of signal strength values is stored within the controller 118 and each signal strength value is associated with a unique gap. As before, an interpolation may be made of the stored table in order to obtain an estimate of the gap. The assembly further includes a transceiver and display assembly 160, which is coupled to a battery or energy storage device 162 by the use of bus 164. The battery 162 and the transceiver and display assembly 160 are each operatively contained within a housing 166. Particularly, the transceiver 160 generates a query type signal 170 to the receiver 114, which causes the receiver 114 to acquire the gap type information from the controller 118. The acquired information is then "read" or accessed by the transceiver 114 and set to the transceiver 160 by the use of signal 172 where it may be displayed to user. It should be appreciated that the transceiver and display assembly 160 may comprise a radio frequency or an infrared type of assembly and that transceiver assembly 114 may similarly comprise an infrared or radio frequency type of transceiver assembly and that signals 170, 172 may respectively comprise radio frequency or infrared type signals. The use of these wireless gap sensor assemblies within the methodologies of the preferred embodiment of the invention will now be more fully delineated.

Figure 4:
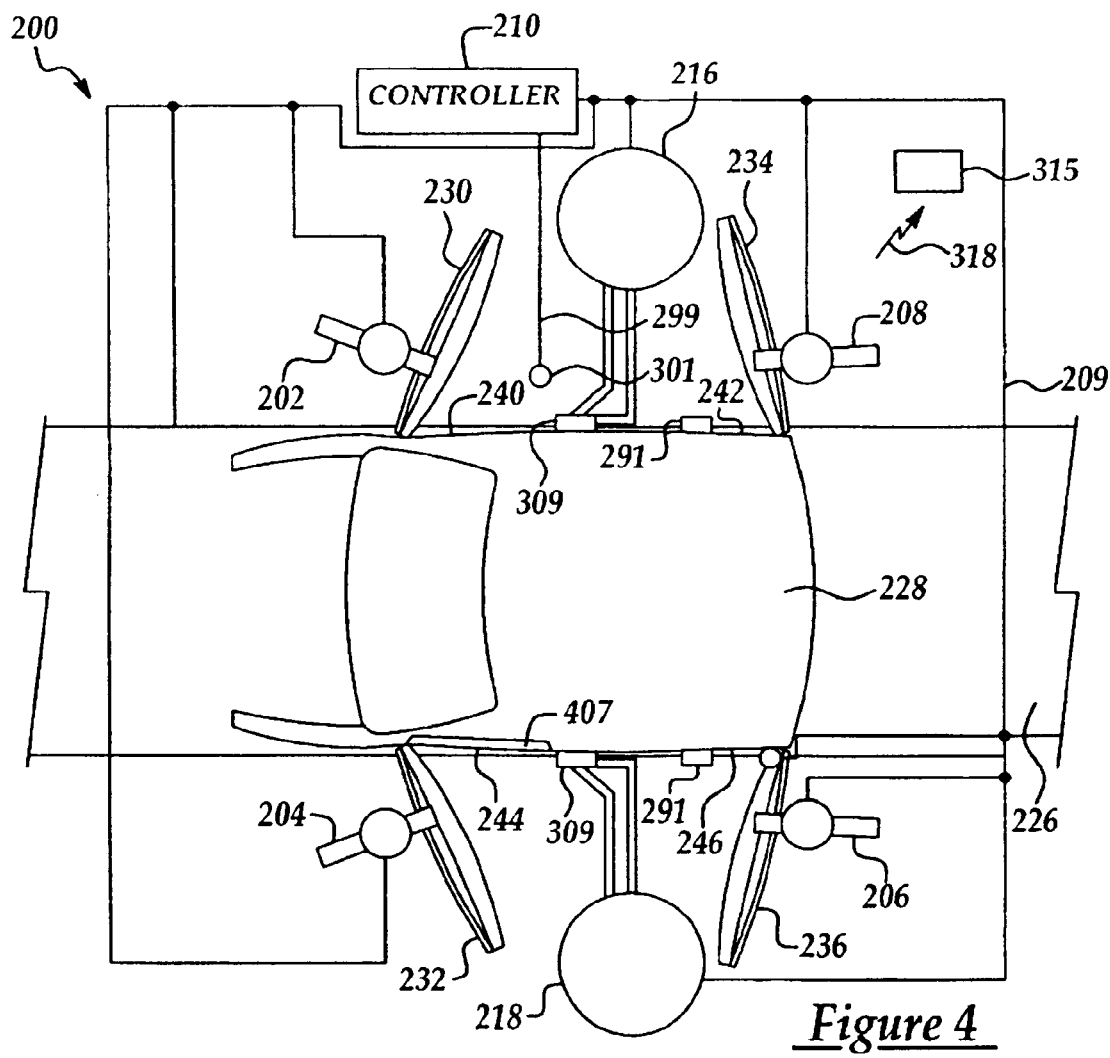
FIG. 4 is a block diagram of an assembly which is used by a methodology of the preferred embodiment of the invention.

Referring now to FIG. 4, there is shown a measurement station or assembly 200, which is made in accordance with the teachings of the preferred embodiment of the invention and which is used by the various methodologies of the present invention. As shown, assembly 200 includes mechanical arm assemblies 202, 204, 206, and 208 that are coupled, by bus 209, and to controller 210, which is operable under stored program control. Assembly 200 further includes robots 216, and 218 that are each coupled to the controller 210 by bus 209. It should be appreciated that controller 210, in other non-limiting embodiments of the invention, may comprise several controllers which cooperatively provide the functionality associated with the controller 210 and which is more fully set forth below. It should also be appreciated that additional mechanical arm assemblies and/or robots may be utilized in other non-limiting embodiments of the invention and that nothing in this description is meant to limit the scope of the present invention to a particular configuration, such as that which is set forth in FIG. 4. As is further shown in FIG. 4, the assembly 200 further includes a transport apparatus 226 which is adapted to receive partially assembled vehicles, such as partially assembled vehicle 228, and to selectively transport these partially assembled vehicular assemblies between the robots 216, 218 and the mechanical arm assemblies 202, 204, 206, and 208 in the manner which is shown in FIG. 4. In one non-limiting embodiment of the invention, the transport assembly 226 comprises a conveyor assembly upon which partially assembled vehicles, such as vehicle 228, are selectively deposited, which is coupled to the controller 210 by bus 209, and which operates under the control, supervision, and direction of the controller 210.

Further, as shown, partially assembled vehicle 228 is of the type including several doors, such as doors 230, 232, 234, and 236 which are adapted to be selectively opened (as shown in FIG. 4) and to be selectively closed and to thereby respectively and abuttingly engage the vehicular frame portions 240, 244, 242, and 246. It should be realized that the present invention is not limited to a single vehicular configuration, such as that which is shown in FIG. 4, but may be applied to a wide variety of dissimilar vehicles including but not limited to those having greater or lesser numbers of doors than have been shown and described with respect to FIG. 4. It should also be realized that partially assembled non-vehicular assemblies may also be deployed upon assembly 226 and become subject to the methodologies of the present invention. Further, it should be appreciated that doors 230–236 may be adjusted by the use of "fitter members" which may be selectively deployed upon doors 230–236 or frame portions 240–246 in order to adjust the fit or reduce gaps between doors 230–236 and respective frame portions 240–246.

Figure 5:
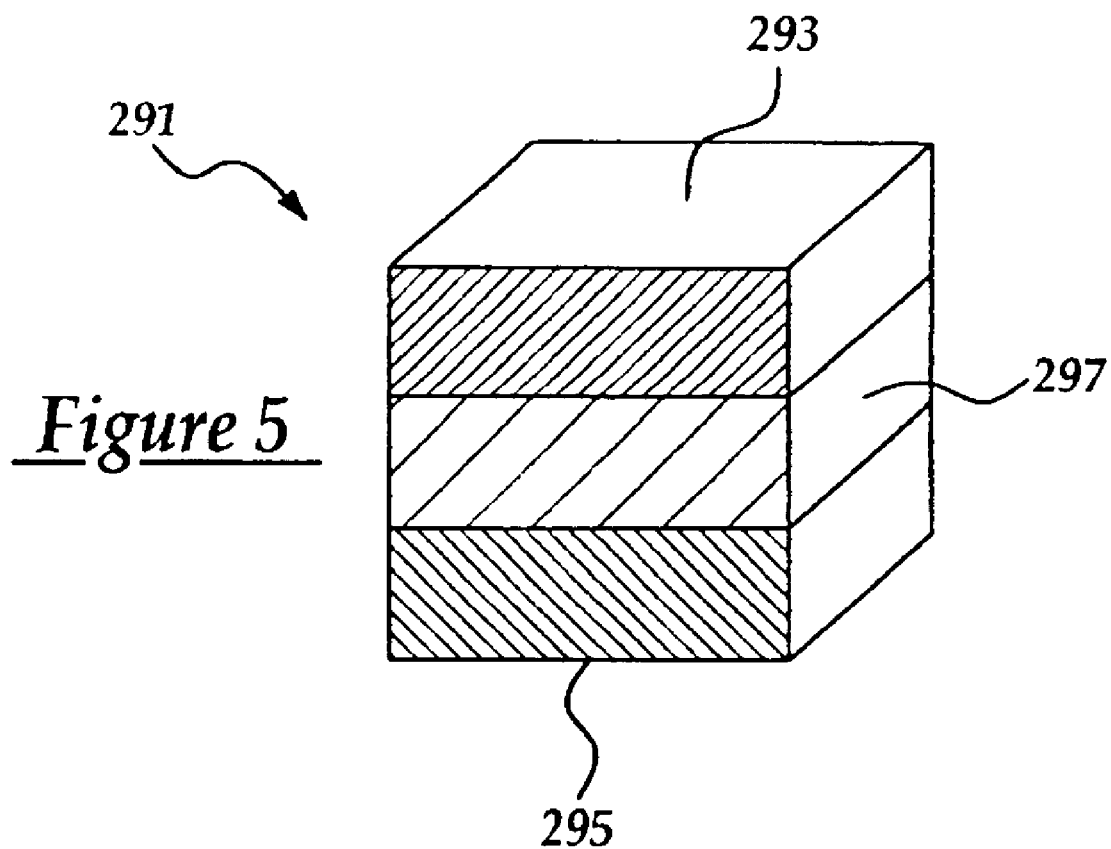
FIG. 5 is a perspective view of a magnet assembly which is used by the methodology of the preferred embodiment of the invention.

Referring now to FIG. 5, there is shown a magnet 291 which is made in accordance with and which is utilized by the methodology of the preferred embodiment of the invention. Particularly, the magnet 291 includes a first relatively strong magnetic portion 293 and a second and relatively weak magnetic portion 295 which is coupled to the relatively strong magnetic portion 293 by the use of a magnetic isolation portion 297. In one non-limiting embodiment of the invention each of the portions 293, 295, and 297 are substantially identical and shaped in the general form of a cube. However, other geometric configurations for each of the portions 293, 295, and 297 may be used in other non-limiting embodiments of the invention.

Figure 6:
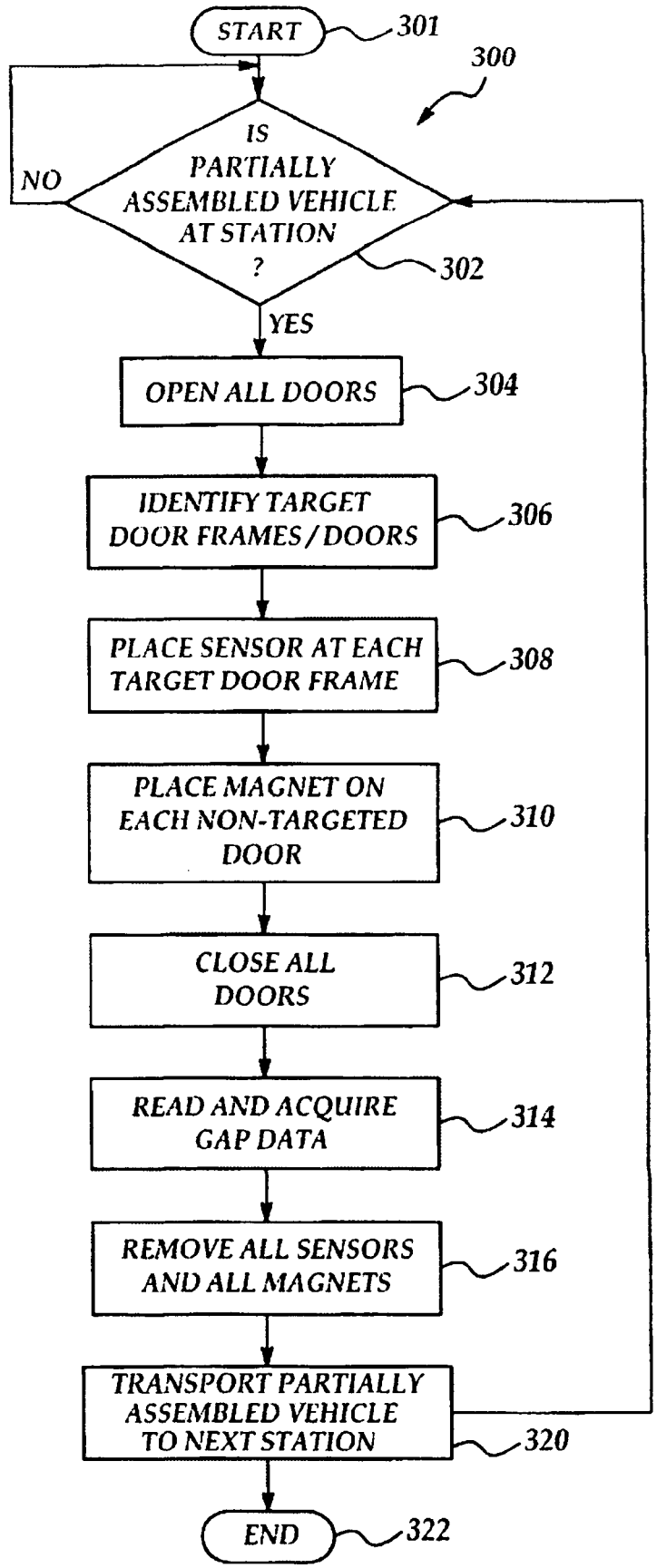
FIG. 6 is a flow chart illustrating the methodology of the preferred embodiment of the invention.

Referring now to FIG. 6, there is shown a methodology 300 of the preferred embodiment of the invention and which utilizes the assembly 200. Particularly, methodology 300 begins with an initial step 301 in which the methodology 300 is begun. Step 302 follows step 301 and, in this step 302, the controller 210 determines whether a partially assembled vehicle, such as partially assembled vehicle 228, is present within the assembly 200 and operatively contained or disposed in or about the position, which is shown in FIG. 4. If a partially assembled vehicle, such as vehicle 228, is operatively disposed within the position, which is shown in FIG. 4, step 302 is followed by step 304. Alternatively, the methodology 300 continues to reside within the step 302. Particularly, controller 210 may make such a determination by the use of a sensor, such as optical sensor 301, which is coupled to the controller 210 by the bus 299.

In step 304, the controller 210 causes each of the mechanical arm assemblies 202, 204, 206, and 208 to respectively open the doors 230, 232, 234, and 236. Step 304 is followed by step 306 in which the controller 210 selects those vehicular frame portions 240, 242, 244, and 246 that are to receive a wireless gap sensor 309. Such a selection may be programmable stored within the controller 210. In one non-limiting embodiment, each wireless gap sensor 309 may be substantially similar to the apparatus which is operatively contained within housing 26 of assembly 10. Step 308 follows step 306 and, in this step 306 and in this non-limiting example of methodology 300, the controller 210 causes the robots 216, 218 to place a wireless gap sensor 309 at each previously selected vehicular frame portion, such as upon vehicular frame portions 240, 244. The sensors 309 may be placed upon the portions 240, 244 by an adhesive or by any other conventional fastening device/assembly, such as a magnet. Step 310 follows step 308 and, in this step 310, the controller 210 causes the robots 216, 218 to place a magnet 291 on some or all of the non-selected vehicular frame portions, such as vehicular frame portions 242, 246. Particularly, in one non-limiting embodiment of the invention, the relatively strong magnetic portion 293 is attached to vehicular frame and the relatively weak magnetic portion 305 of the deployed magnets 291 will respectively attach the frame portions 242, 246 to the doors 230, 232 which will be later respectively opened by the mechanical arms 202, 204 which have a lower "opening force" than do the robots 216, 218. Step 312 follows step 310 and, in this step 312, the controller 210 causes the mechanical arm assemblies 202, 204, 206, and 208 to close all of the doors 230, 232, 234, and 236, thereby in the embodiment which is shown in FIGS. 3 and 4, causing the vehicular doors 230 and 232 to engage the previously and operatively disposed wireless sensors 309.

Step 314 follows step 312 and, in this step 314, the wireless sensors 309 discern the existence of a gap between the door 230 and the vehicular frame portion 240 and between the door 232 and the vehicular frame portion 242 and these sensors 309 therefore read and acquire the respective gap data and measure the respective width of these discerned gaps. This gap related information, in one non-limiting embodiment of the invention, is wirelessly transmitted to receiver 315 by the use of signals 318. In one non-limiting embodiment, receiver 315 is substantially similar to receive display assembly 40. Step 316 follows step 314 and, in this step 316, the controller 210 causes the robots 216, 218 to remove the sensors 309 and all previously deployed magnets 291. Step 320 follows step 316 and, in this step 320, the partially assembled vehicle 228 is moved to the next vehicle assembly station. Step 322 follows step 320 and, in this step 322, the present methodology 300 is ended. Further, step 302 follows step 322 and controller 210 determines whether another partially assembled vehicle, such as vehicle 228, is present. It should be realized that unacceptably large gaps may be substantially eliminated by the use of door fitter members which tighten the fit between the doors 230–236 and the respective frame portions 240–246 or by the use of additional sealer members.

Figure 7:
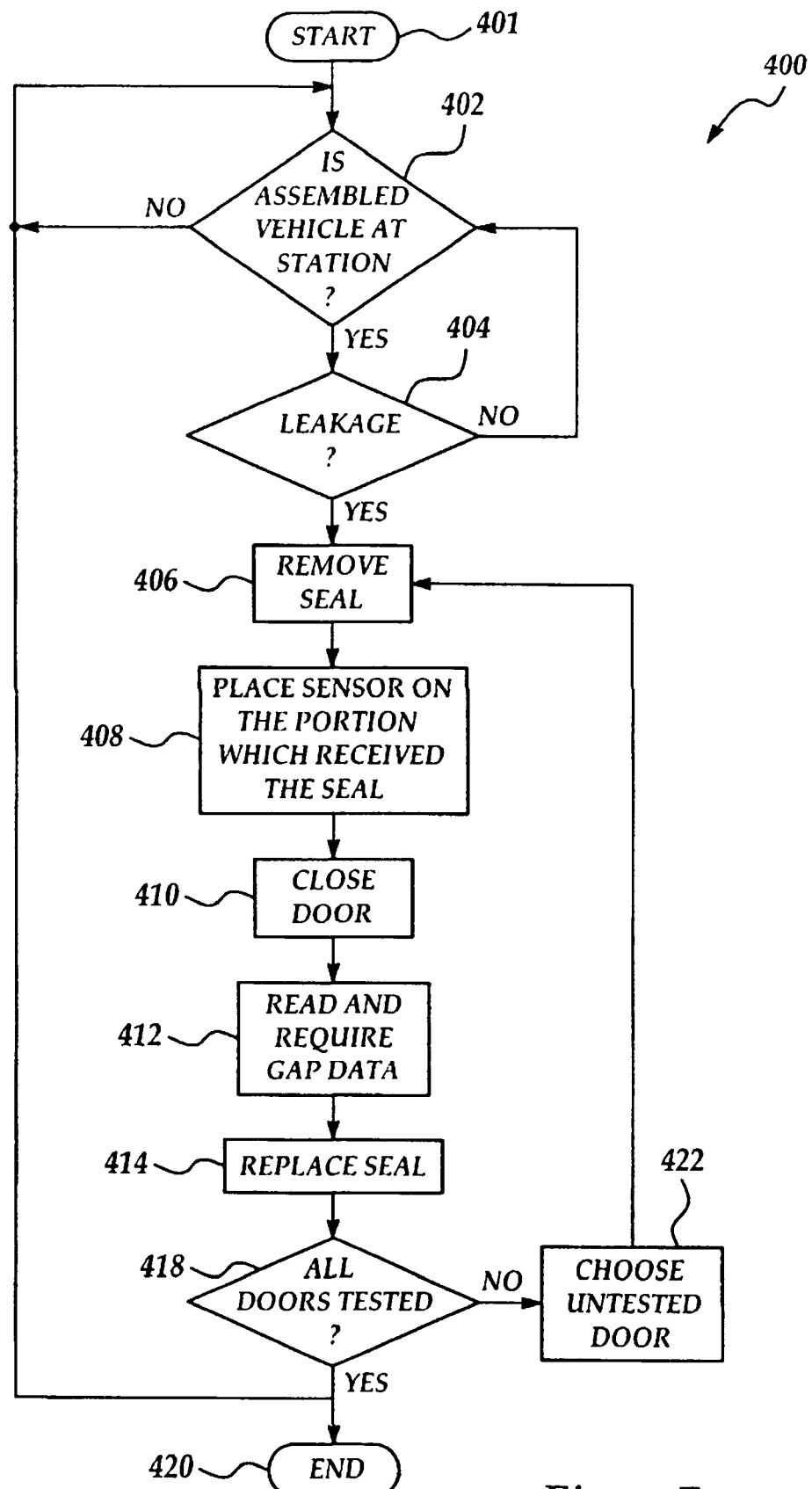
FIG. 7 is a flow chart illustrating the methodology of a second embodiment of the invention.

Referring now to FIG. 7, there is shown a methodology 400 of a second embodiment of the invention. Particularly, methodology 400 begins with an initial step 401 in which the methodology 400 is begun. Step 402 follows step 401 and, in this step 402, it is determined whether an assembled vehicle, such as vehicle 61 of FIG. 3, is present. Such a determination may be made manually (e.g., by visual inspection) or be the use of the combination of a controller and a sensor such as controller 210 and sensor 301. Step 402 is followed by step 404 if a assembled vehicle is present. Alternatively, methodology 400 remains within the step 402. In step 404 it is determined whether leaking is occurring within the vehicle. If no leakage is has occurred (or is suspected), step 404 is followed by step 402, the vehicle is removed from the testing facility, and the methodology 400 senses the presence of a new vehicle. Alternatively, step 404 is followed by step 406.

In step 406, the seal that is normally disposed upon a vehicular frame member and between the vehicular frame member and a door (such as seal 407 which is shown in FIG. 4) in the area of a suspected leak is removed. Step 406 is followed by step 408 and, in this step 408, a wireless gap identification and measurement sensor is attached to the frame member from which the seal has been removed. Such a sensor may be substantially identical to the sensor 309 which is shown in FIG. 4. Step 410 follows step 408 and, in this step 410, the door which typically and abuttingly engages the frame portion from which the seal has been removed is closed and engages the previously and operatively disposed wireless sensor. Step 412 follows step 410 and, in this step 412, the wireless sensor reads and acquires gap data by identifying the existence of and the size of a gap existing between the door and the door frame portion in close proximity to the door. This data may be substantially similar to receiver/display assembly 40.

Step 414 follows step 412 and, in this step 414, the seal, such as seal 407, is placed back upon the vehicular frame member from which it was removed. Step 418 follows step 416 and, in this step 418, it is determined whether all of the other vehicular doors are to be tested. If additional doors are not to be tested, step 418 is followed by step 402 in which the methodology 400 awaits another vehicle. Further, step 418 is followed by 420 in which the current processing of methodology 400 is ended. Alternatively, step 418 is followed by step 422 in which another door is chosen. Steps 406–418, which are applied to the newly chosen door, follow step 422. It should be appreciated that unacceptable large gaps may be substantially reduced and/or eliminated by fitter members or additional sealer members.

Figure 8:
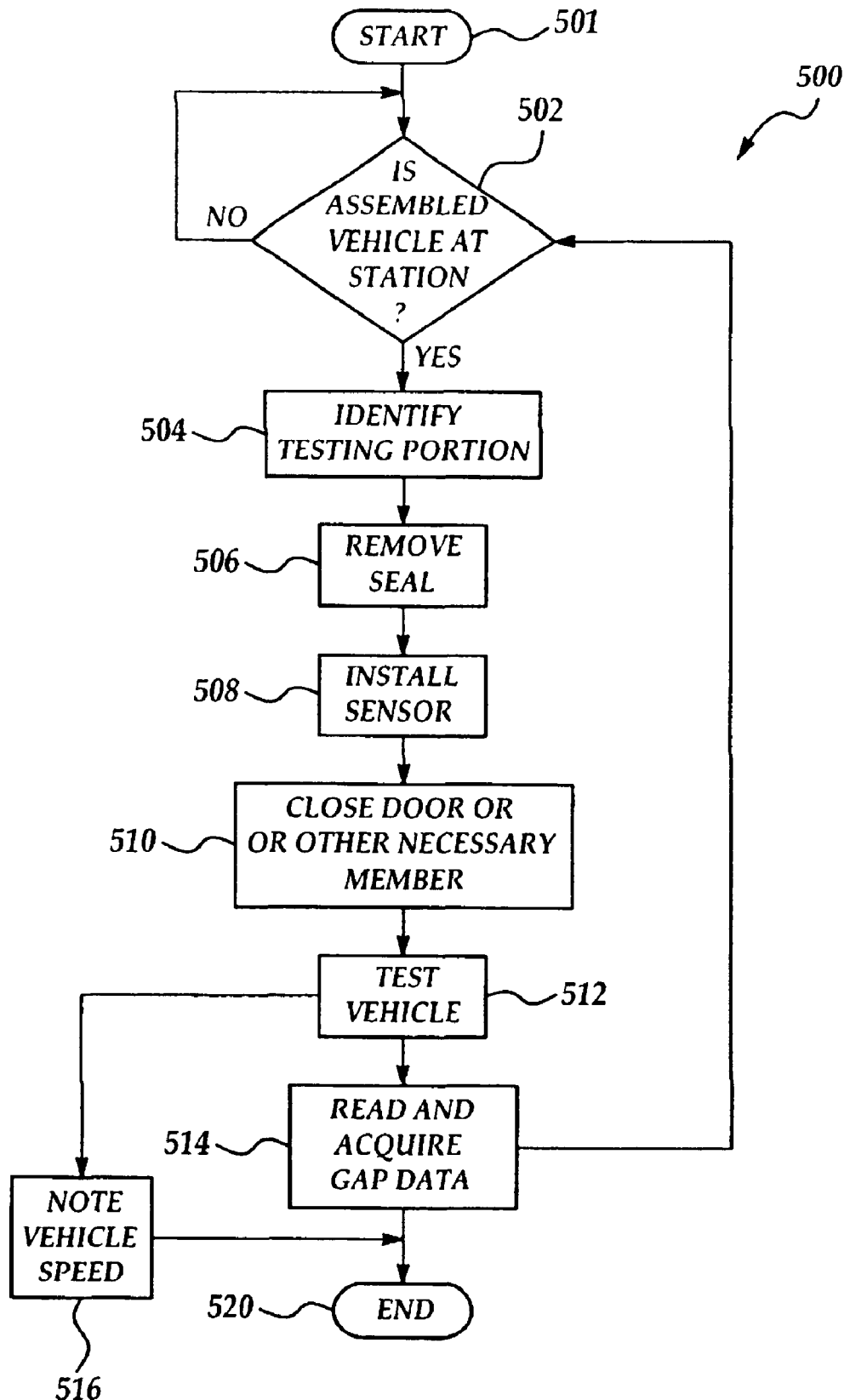
FIG. 8 is a flow chart illustrating the methodology of a third embodiment of the invention.

Referring now to FIG. 8, there is shown a methodology 500 of a third embodiment of the invention. As shown, methodology 500 begins with an initial step 501 in which the methodology 500 is begun. Step 501 is followed by step 502 in which it is determined whether an assembled vehicle is present at the testing station or assembly. If a vehicle is present, step 502 is followed by step 504. Alternatively, the methodology 500 remains within the step 502. In step 504, the portion of the assembled vehicle (or other assembly) to be tested is identified and step 504 is followed by step 506.

Step 506 follows step 504 and, in this step 506, a seal is removed from the tested portion; the removed seal to the door abutting the vehicle whose deflection is to be ascertained. Step 508 follows step 506 and, in this step 508, a wireless gap sensor is installed upon the assembled vehicle at the location of the previously removed seal. The gap sensor, in one non-limiting embodiment, may be substantially similar to sensor 300. Step 510 follows step 508 and, in this step 510, the door or other member is closed in a typical fashion in order to abuttingly engage the tested portion and the deployed sensor. Step 512 follows step 510 and, in this step 512, the vehicle (or other assembly) is operated at a certain speed. Alternatively the vehicle or other assembly may be tested statically, such as in a wind tunnel. Step 514 follows step 512 and, in this step 514, the sensor notes the deflection of the vehicular testing portion or door by reading and acquire gap deflection (e.g., the force on the sensor changes as the vehicle is being operated due to, for example, the deflection of the door toward or away from the operatively deployed sensor). Step 516 occurs concurrently with step 514 and, in this step 516, the speed of the vehicle is noted. Step 516 is followed by step 520 and the vehicle is removed from the testing assembly and the current operation is ended. The methodology 50 returns to step 502 to discern whether another vehicle has been received.

It is to be understood that the invention is not limited to the exact construction and method which has been delineated above, but that various changes and modifications may be made without departing from the spirit and the scope of the inventions as are more fully delineated within the following claims.

What is claimed is:

1. A method for determining the existence of a gap between the door frame and a door of a vehicle of the type having a removable seal member which is operatively disposed upon said frame, said method comprising the steps of determining the existence of leakage into said vehicle; removing said seal after said existence of said leakage is determined; providing a wireless gap sensor; opening said door of said vehicle; removing said seal; operatively mounting said wireless gap sensor upon said frame; closing said door against said wireless gap sensor, effective to cause said wireless gap sensor to ascertain the existence of a gap between said door frame and said door of said vehicle.

2. The method of claim 1 further comprising the steps of providing a receiver; causing said receiver to be in communication with said wireless gap sensor; and causing said wireless gap sensor to generate and communicate a signal to said receiver when said gap has been ascertained.

3. The method of claim 2 further comprising the step of reducing said gap between said door frame and said door of said vehicle.

4. The method of claim 3 wherein said step of reducing said gap between said door frame and said door of said vehicle comprises the steps of providing a second seal; and operatively disposing said second seal upon said frame of said door.

5. The method of claim 2 further comprising the step of displaying information indicative of the existence of said gap.

6. The method of claim 1 further comprising the step of placing the removed seal upon said frame in the position from which it originally was removed from only after said gap has been ascertained.

7. The method of claim 1 wherein said step of providing a wireless gap sensor further includes the steps of:

providing a strain gauge;

providing a controller; and communicatively coupling said strain gauge to said controller.

8. The method of claim 7 wherein said step of communicatively coupling said strain gauge to said controller further comprises the steps of:

providing a source of energy; and communicatively coupling said source of energy to said controller and to said strain gauge.

9. The method of claim 8 further comprising the steps of:

providing a transmitter;

communicatively coupling said transmitter to said controller; and communicatively coupling said source of energy to said transmitter.

10. The method of claim 9 further comprising the steps of:

providing a housing;

operatively disposing said source of energy, said transmitter, and said strain gauge within said housing;

providing a member which is selectively movable; and coupling said selectively movable member to said strain gauge in a location wherein said movable member protrudes outside of said housing.

11. The method of claim 10 wherein said step of providing a strain gauge further comprises the steps of:

providing a first magnet having a relatively strong magnetic portion;

providing a second magnet having a relatively weak magnetic portion;

providing an isolation portion; and coupling said first magnet to said second magnet by the use of said isolation portion.

12. The method of claim 11 wherein said first magnet, said second magnet, and said isolation portion are generally square in shape, said method further comprising the steps of:

coupling said first magnet to said isolation portion; and coupling said second magnet to said isolation portion, effective to form a cube shaped magnetic assembly.

13. The method of claim 10 further comprising the steps of:

closing said door of said vehicle upon a portion of said member which protrudes from said housing, effective to generate a measurable force upon said member.

14. The method of claim 7 wherein said step of providing a controller further comprises the steps of:

providing a gap measurement table;

operatively disposing said gap measurement table within said controller; and developing said gap measurement table through calibration.

15. The method of claim 1 wherein said step of determining said leakage within said vehicle further comprises the steps of:

providing a wind tunnel;

providing a leakage sensor;

placing said leakage sensor within said vehicle; and placing said vehicle within said wind tunnel.

16. The method of claim 1 wherein said step of determining said leakage within said vehicle further comprises the step of visually and manually inspecting said vehicle.

* * * * *